Aug. 23, 1966 J. R. MARTIN 3,268,137
METHOD AND APPARATUS FOR CUTTING TUBES
Filed May 3, 1965 4 Sheets-Sheet 1
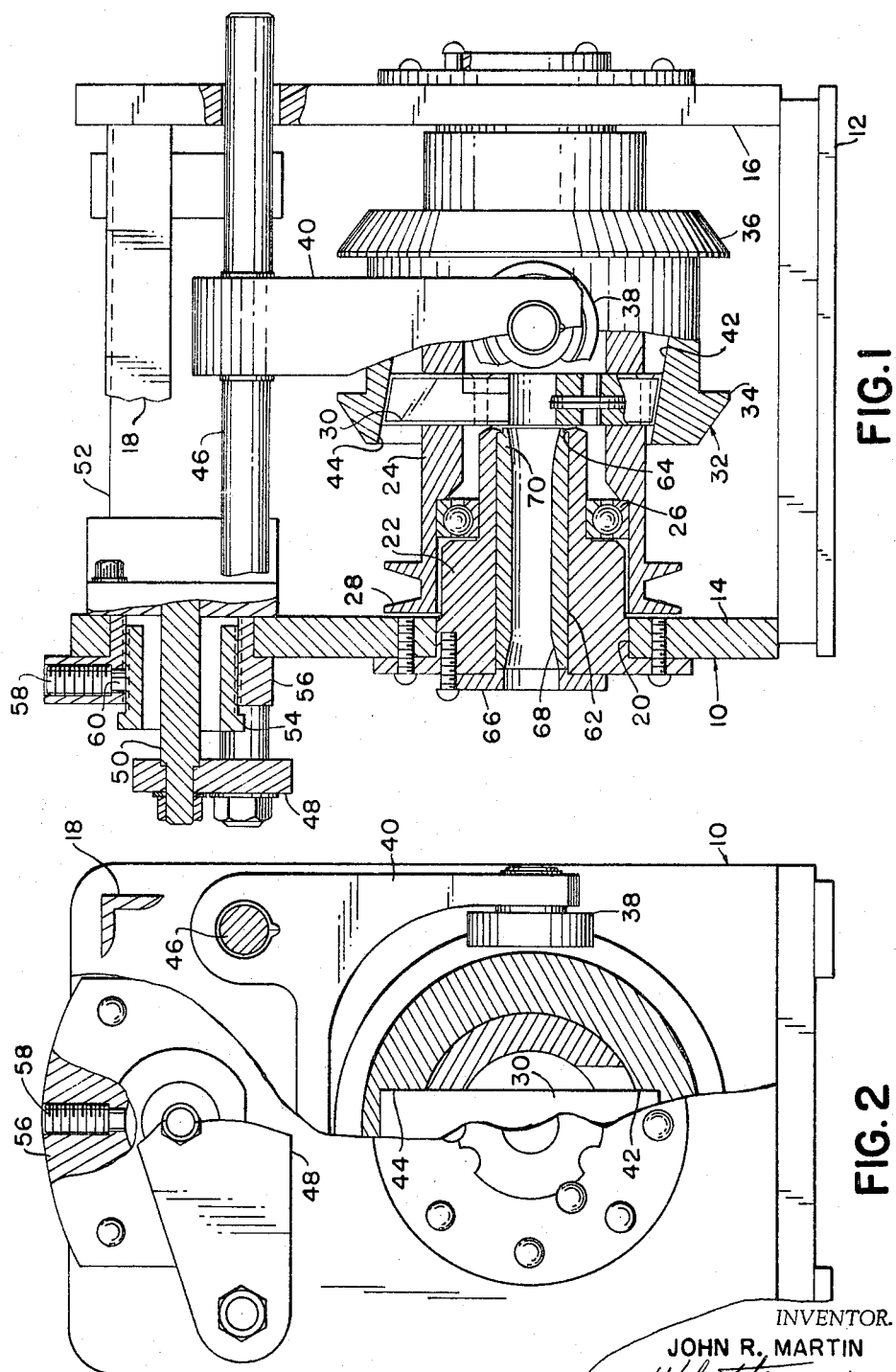
INVENTOR.
JOHN R. MARTIN
BY Whittemore,
Hulbert & Belknap
ATTORNEYS

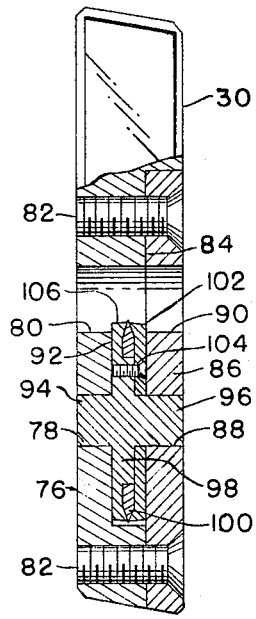
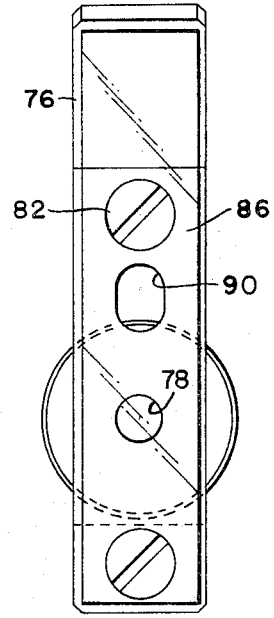
FIG. 4      FIG. 3
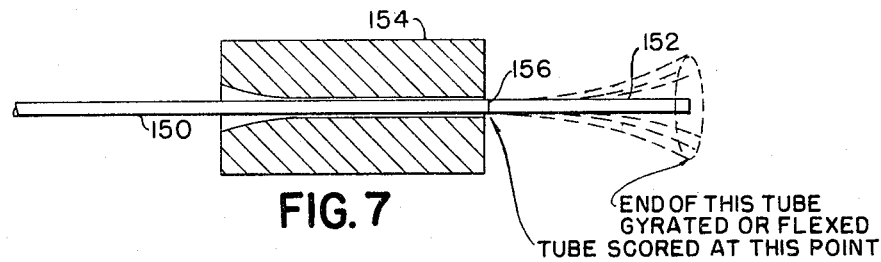
FIG. 7
END OF THIS TUBE GYRATED OR FLEXED
TUBE SCORED AT THIS POINT
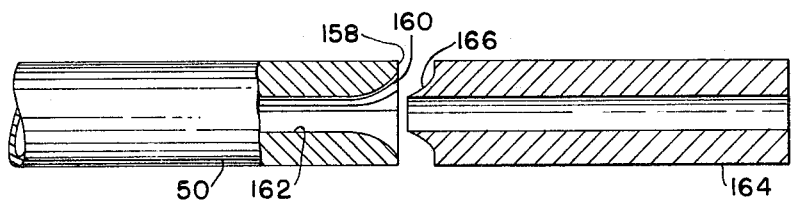
FIG. 8
INVENTOR.
JOHN R. MARTIN
BY *Whittemore,
Hulbert & Belknap*
ATTORNEYS Aug. 23, 1966       J. R. MARTIN       3,268,137
METHOD AND APPARATUS FOR CUTTING TUBES
Filed May 3, 1965                    4 Sheets-Sheet 3

INVENTOR.
JOHN R. MARTIN
BY Whittemore
Hulbert & Belknap
ATTORNEYS

Aug. 23, 1966    J. R. MARTIN    3,268,137
METHOD AND APPARATUS FOR CUTTING TUBES
Filed May 3, 1965    4 Sheets-Sheet 4
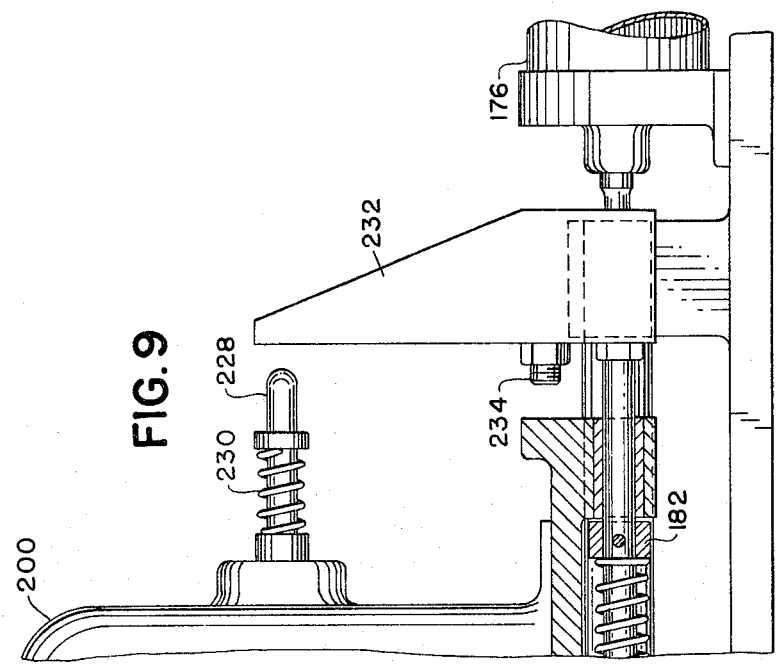
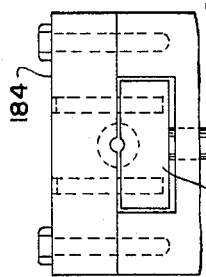
INVENTOR.
JOHN R. MARTIN
BY *Whittemore,*
*Hulbert & Belknap*
ATTORNEYS United States Patent Office 3,268,137
Patented August 23, 1966

3,268,137
METHOD AND APPARATUS FOR CUTTING TUBES
John R. Martin, Allen Park, Mich., assignor to Calumet & Hecla, Inc., Allen Park, Mich., a corporation of Michigan
Filed May 3, 1965, Ser. No. 452,512
21 Claims. (Cl. 225—2)

The present invention relates to method and apparatus for cutting tubes.

It is an object of the present invention to provide an improved method and apparatus for cutting tubes such for example as small metal tubes in an operation characterized by the absence of chips or burrs.

It is a further object of the present invention to provide a method and apparatus for severing metal tubes characterized in that the cut end of the tube at the outside diameter is substantially perpendicular to the axis of the tube and intersects the outer surface of the tube in a solid angle of 90 degrees while the corner formed between the intersection of the cut end surface of the tube and the inner surface thereof is slightly chamfered.

It is a further object of the present invention to provide a method and apparatus for severing lengths of tubing in which the tubing is simultaneously scored around its circumference and at the same time is flexed with the flexing action localized substantially at the scored circumference.

It is a further object of the present invention to provide a method and apparatus for severing tubing in which portions of the tubing remote from the severance zone are held against lateral displacement, and pressure is applied through a scoring tool progressively around the circumference of the tube in a manner to simultaneously flex the tube and to provide a score or cut of controlled depth.

More specifically, it is an object of the present invention to provide a scoring tool for use in apparatus of the character described comprising a circular cutting blade and housing structure therefor having lips spaced radially inwardly of the cutting edge of the blade to constitute a stop to prevent cutting to a greater than desired depth and to also function as means for rolling back any burr formed during the scoring operation.

More specifically, it is a feature of the present invention to provide apparatus including spaced aligned tubular shrouds through which a length of tubing to be severed is advanced, a rotary cutter housing, a cutting wheel housing rotatable with said cutter housing and movable radially thereof, said cutting wheel housing having an elongated opening therethrough which receives the tubing and which adjacent one end is provided with a rotary cutting wheel.

Other objects and features of the invention will become apparent as the description proceeds, especially when taken in conjunction with the accompanying drawings, illustrating preferred embodiments of the invention, wherein:

FIGURE 1 is a side elevation, partly in section, of the improved tube severing apparatus.

FIGURE 2 is an end view of the apparatus shown in FIGURE 1, with parts broken away.

FIGURE 3 is an elevational view of the cutter wheel housing assembly.

FIGURE 4 is a side view of the structure shown in FIGURE 3, with parts in section.

FIGURE 7 is a diagrammatic sectional view illustrating the severance of the end of the tube.

FIGURE 8 is an enlarged elevational view, partly in section, showing the shape of the end of the severed portion of the tube and the shape of the tube end.

FIGURE 9 is an elevational view, mostly in section, of a tube end severing apparatus.

FIGURE 10 is a fragmentary view looking in the direction of the arrows 10—10, FIGURE 9.

Figure 6:
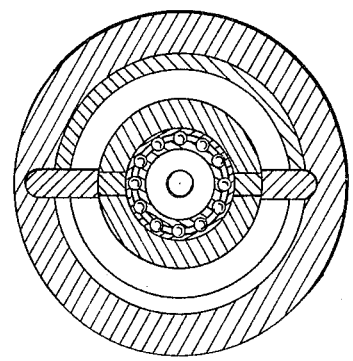
FIGURE 6 is a fragmentary section to a smaller scale on the line 6—6, FIGURE 5.

Referring now to FIGURES 1–4 there is shown a preferred embodiment of the present invention. The apparatus comprises a welded frame indicated generally at 10 including a base plate 12 and end plates 14 and 16 the upper ends of which are interconnected by angle irons 18.

The end plates 14 and 16 are provided with circular openings 20 which receive bearing retainers 22. Only the front bearing retainer 22 is shown in section but the rear bearing retainer is of equivalent construction. The bearing retainers 22 support a cutter housing 24 for rotation by suitable bearing means indicated at 26. The cutter housing 24 is provided with sheave means 28 by means of which the cutter housing may be rotated relatively rapidly.

Mounted for rotation with the cutter housing and for radial movement with respect thereto is a cutter wheel assembly 30 details of which are best seen in the enlarged views of FIGURES 3 and 4. For the time being however, it is sufficient to note that the cutter wheel housing is provided with an elongated opening at one end of which the edge of a cutting wheel assembly is located.

Means are provided for controlling radial movement of the cutter wheel housing 30 relative to the cutter housing 24 during the cut-off operation. For this purpose a cam collar 32 is provided having a pair of flanges 34 and 36 between which rollers 38 are received. The rollers 38 are carried at the ends of the arms of a yoke 40 which will subsequently be described.

The cam collar 32 includes a pair of inclined diametrically opposed slots 42 and 44 which receive the ends of the cutter wheel housing 30. The cam collar 32 is shiftable axially of the cutter housing 24 by the yoke 40 and as it is thus shifted the inclined bottom surfaces of the slots 42 and 44 effect controlled radial displacement of the cutter wheel housing 30.

The yoke 40 is connected to rods 46 which in turn are connected to a plate 48, the latter in turn being secured to one end of a piston rod 50 which in turn is connected to a piston located within an air cylinder 52. Travel of the yoke 40 is controlled by means of an adjustable abutment screw 54 threaded into an adjustment plate 56 secured to the frame of the machine. After it has been adjusted into position to limit the cutting stroke of the cutter wheel housing 30, it is clamped in position by means of a set screw 58 acting through a brass plug 60.

Located in each of the bearing retainers 22 is a shroud tube 62 the dimensions of which are selected in accordance with the particular tube being severed. The shroud tube 62 has an outer peripheral groove at its inner end which receives an inwardly directed flange 64 at the inner end of the bearing retainer 22. The shroud tube 62 is retained in assembled position by means of an end plate 66 as illustrated. The outer end of the shroud tube 62 is tapered as indicated at 68 to facilitate introduction of the end of the tubing into the cut-off mechanism. The opposite end of the shroud tube 62 has a tapered throat 70 dimensioned in accordance with the particular size of tube being operated on and designed to provide stationary zones in the tubing at points axially separated from the cut-off zone so as to produce the most efficient severing action.

Referring now to FIGURES 3 and 4, the cutter wheel housing assembly 30 is illustrated. This assembly comprises an elongated housing member 76 provided with a circular opening 78 and an elongated opening 80, together with two tapped openings for the reception of assembly screws 82. At one side the housing member 76 is recessed as indicated at 84 for the reception of a cover plate 86 having a circular opening 88 in registration with the circular opening 78 and an elongated opening 90 in registration with the elongated opening 80.

The cutter wheel assembly comprises a wheel 92 having oppositely extending shaft portions 94 and 96. The wheel 92 includes an enlarged hub portion 98 at one side thereof. Mounted on the hub portion 98 of the wheel 92 is the cutting disc proper 100. Cover plate 102 is secured to the hub portion of the wheel 92 by suitable means such as the screws indicated at 104. The confronting peripheral portions of the wheel 92 and the cover plate 102 are inclined inwardly towards the cutting disc and are adapted to engage the edges of the cutting disc a very short distance inwardly from the external cutting edge of the disc. For example, the cutting edge of the disc may protrude beyond the slightly inclined surfaces 106 of the wheel and cover plate by about .006–.008 inch.

The parts are so dimensioned that the wheel 92 together with the disc 100 and the cover plate 102 are rotatable as a unit, thus continually presenting new portions of the cutting edge of the disc for engagement with the tube during the cut-off operation. It will be observed that the cutting disc assembly just enters into one end of the elongated openings 80, 90. In use the tube is entered into the apparatus through the shroud tube 62 and advanced until the point at which severance is to take place reaches the zone of the cutter wheel housing assembly. The cutter housing 24 is rotated by suitable means such for example as a belt connected to the sheave means 28. At this time the cam collar 32 is to the left so that the cutter wheel housing assembly 30 is in a position such that the cutter wheel assembly including the disc 100 is separated from the outer surface of the tube. At this time air is admitted to the cylinder 52 moving the piston therein to the right as seen in FIGURE 1, and shifting the cam collar 32 to the right to the extent permitted by engagement between the plate 48 and the adjustable abutment screw 54. During this operation the sharp cutting edge of the disc 100 first engages one side of the tube and as the cutter housing 24 rotates, the cutting edge of the disc scores the outer surface of the tube in a circular score extending around its circumference. Continued radial movement of the cutter wheel housing assembly 30 causes the cutting disc 100 to cut the depth which is permitted by the amount which it extends beyond the surfaces 106. At the same time force is applied to cause a bending or flexing of the tube, this force being applied initially by the cutting disc and subsequently in part by the surfaces 106 of the wheel 92 and of the cover plate 102. The tube fits fairly snugly within the shroud tube 62 so that the above described action causes the tube to be flexed laterally and this flexing to be carried repeatedly around the circumference of the tube. The tubing is restricted from rotation by various means normally incorporated in equipment feeding tubing to described cutting apparatus. The combination of flexing and the scoring or cutting by the cutting disc produces a tube severing action which produces severance without chips of without appreciable burrs.

As the peripheral edge of the cutting disc 100 first penetrates into the material of the tube it tends to produce a slight burr at opposite sides of the wheel. However, when the wheel penetrates to full depth these burrs or protuberances are engaged and are ironed down by the surfaces 106 as the cutter wheel assembly including the wheel 92 orbits around the circumference of the tube.

The flexing of the tube tends to thin the material of the tube in the zone opposite to the application of pressure thereto. The ultimate action obtained when the tube is severed is that the end surface of the tube is substantially perpendicular to the axis of the tube where it intersects the outer surface thereof. At the intersection between the end surface of the tube and the inner surface thereof, the thinning of the tube wall at the zone remote from the application of pressure results in the production of a chamfered surface which is particularly desirable.

The operation is extremely rapid and the tube is severed without the production of chips which if present might form a contaminant making cleaning of the tubes comuplsory after severance. With the present invention the absence of chips permits the tubes to be assembled into structures without subsequent cleaning.

The foregoing construction is characterized essentially by the provision of a combined cutting and tube flexing wheel assembly orbiting around the tube and progressively moved radially inwardly with respect thereto until severance of the tube takes place.

Figure 5:
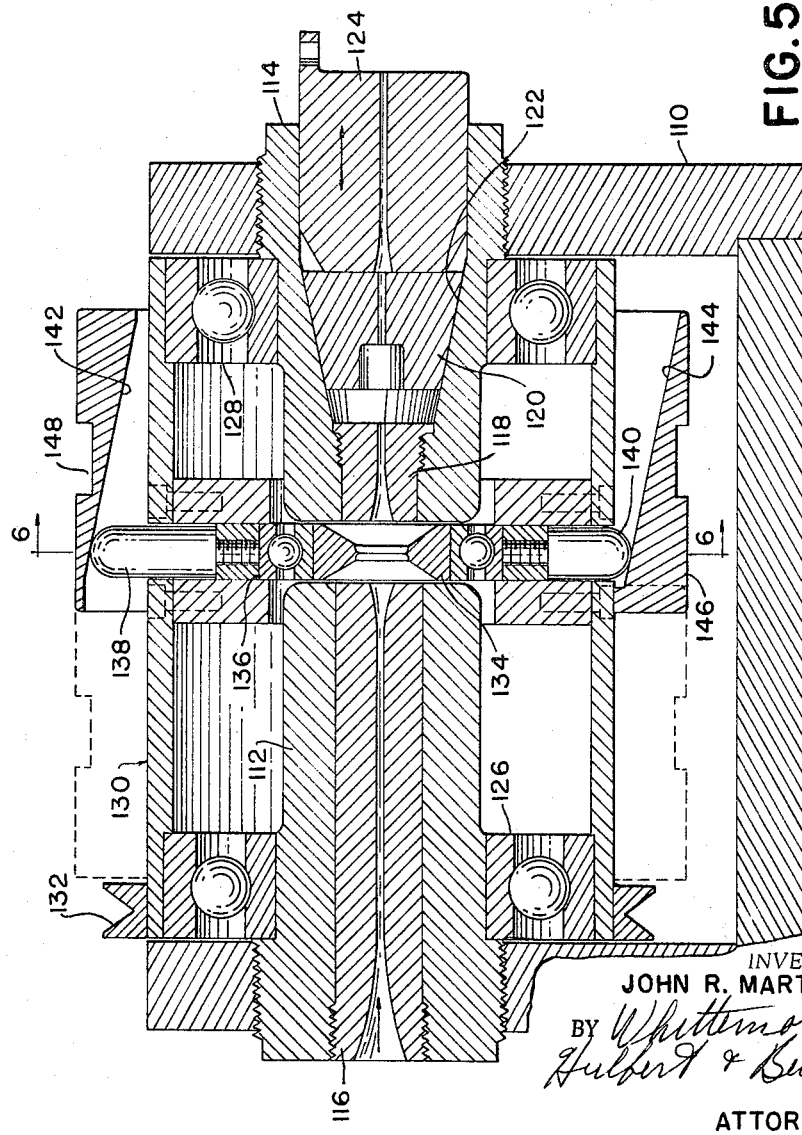
FIGURE 5 is a longitudinal sectional view of a somewhat different embodiment of the present invention.

Referring now to FIGURES 5 and 6 there is illustrated a somewhat different embodiment of the present invention, which however, operates on generally similar principles. A means of clamping the tube to restrict rotation is incorporated in the apparatus and the cutting edge for scoring is located on the inside circumference of an annular disc. In these figures a frame 110 is provided in which a pair of elongated support members 112 and 114 are mounted. A shroud tube 116 is located in the support member 112 and a short shroud tube 118 is provided in the support member 114. A split clamp 120 is provided in a conical recess 122 in the support member 114 and is operated into and out of clamping engagement with a tube by means of a block 124 movable in the direction indicated by the arrow in FIGURE 5.

Mounted for rotation on bearings 126 and 128 is a cutter assembly 130 adapted to be rotated by a suitable means such for example as a belt applied to a sheave 132. The cutter assembly 130 includes an annular cutter disc 134 having an inwardly directed cutting edge engageable with the tube. Extending around the annular cutter disc 134 is an annular member 136 to which are connected a pair of diametrically oppositely extending pins 138 and 140. The pins extend through openings in the cutter assembly 130 and are engaged in inclined slots 142 and 144 respectively in a cam collar 146. The cam collar 146 is moved by suitable means such for example as rollers received in the annular peripheral groove 148 axially of the assembly so as to effect radial movement of the annular cutting disc 134.

In this case, as in the previously described embodiment, the cutting element includes not only a knife edge for effecting severing and cutting penetration of the material of the tube, but also surfaces adjacent the sharp knife edge which will function to limit the depth of cut and to smooth or iron down any burrs produced by the cutting or scoring action.

Referring now to FIGURES 7 and 8 there is illustrated an operation in which a tube 150 has a relatively short end portion 152 severed therefrom. As seen in FIGURE 7, this is accomplished by supporting the tube against lateral displacement and preferably against rotation by suitable means such as a clamp 154. The free end of the tube is gyrated or flexed in a circular path or in a spiral path of increasing radius. After predetermined gyrating of the tube end the tube is scored as indicated at 156.

The result of the operation described in connection with FIGURE 7 is to cause the tube 150 to have its end shaped as indicated in FIGURE 8. In this figure it will be observed that the end surface 158 of the tube is substantially flat and perpendicular to the axis of the tube. However, the tube wall is thinned adjacent the end, providing a somewhat bell shaped end portion 160 to the cylindrical opening or passage 162 through the tube. The severed end portion indicated at 164 has the end which was adjacent to the tube 150 shaped as indicated including an axial projection 166 centrally thereof. This is an undesirable shape for the end of a tube, but the severed end 164 is scrapped.

Referring now to FIGURES 9 and 10, apparatus for cutting off the end portion 164 of the tube 150 is illustrated. The apparatus comprises a stationary base 170 provided with parallel horizontal guide rods 172 on which a cutter slide 174 is slidable. Mounted on the base 170 is an air cylinder 176 having a piston therein connected to an activator rod 178. The activator rod is longitudinally slidable in bushings provided in the cutter slide 174 and is spring biased by a compression spring 180, one end of which is seated against a portion of the slide and the other end engages a spring seat 182 pinned or otherwise connected to the rod 178.

The cutter slide 174 carries a tube support structure including an upper stationary jaw 184 and a lower movable clamping jaw 186 connecteed to a rod 188 at the lower end of which is a head 190 engaging a compression spring 192, the lower end of which engages a vertically movable spring seat 194. The spring seat 194 is adapted to be cammed upwardly by an inclined cam 196 formed on the rod 178 and when thus moved upwardly, to establish a predetermined pressure between the fixed and movable jaws to clamp the tube 150 against lateral displacement and against rotation. If desired, rotation of the tube 150 may be prevented by means other than the jaws 184 and 186.

Located on the cutter slide 174 is a motor 200 having a hollow drive shaft 202 on which is carried a driver 204 having transversely extending ways 206 in which a carrier 208 is movable.

The carrier includes an arm 210 at one end of which is provided a cutter wheel 212. The cutter wheel has its periphery shaped to provide a sharp circular cutting edge 214 and at one side of the cutting edge there is provided a shoulder 216 for the purpose of rolling in any metal displaced by the scoring operation. The arm 210 is also provided with a projection 218. It will be observed that the cutter wheel is located directly adjacent the tube support provided by the jaws 184 and 186 and that it is located further from the axis of the tube 150 than is the operating portion of the projection 218. The projection 218 however, is spaced substantially beyond the wheel 212 from the tube support provided by the jaws 184 and 186.

The carrier 208 is provided with an opening 220 in alignment with the tubular motor shaft 202 having an inclined camming surface 222. Movable longitudinally through the tubular motor shaft 202 is a rod 224 having a camming head 226 operable against the inclined surface 222 of the carrier 208. The rod 224 has an end portion extending beyond an end portion 228 extending through the motor and is spring biased to a limiting position by the compression spring 230.

Connected to the activator rod 178 is a pusher arm 232 having an adjustable stop 234 engageable with an end surface of the cutter slide 174 and having an upwardly extending portion engageable with the end 228 of the rod 224.

Upon initial movement to the left of the activator rod 178, the spring 180 causes the cutter slide 174 to move in unison therewith. At this time the tube 150 may have its free end located at the position shown by the line 150e. The lower clamping jaw 186 is only lightly biased by the compression spring 192 and the movement of the cutter slide 174 causes the clamp to move over the end of the tube. The movement of the slide continues until it engages a shoulder 236 on the base. Continued movement of the piston in the cylinder causes the activator rod 178 to continue its movement to the left relative to the cutter slide. This has the effect of biasing the movable spring seat 194 upwardly to clamp the tube 150 in position. The motor 200 may be operating at this time or may be started at about this juncture which will cause the carrier 208 to rotate about the axis of the tube with the tube bending projection 218 and the periphery of the wheel 212 occupying the full line position shown in FIGURE 9. It will be understood of course that during the tube cut-off operation, the slide 174 is to the left of its illustrated position and actually in engagement with the shoulder 236 as previously described. Rotation of the driver 204 will cause the carrier 208 to remain in its inactive position as a result of centrifugal force acting on its arm portion 210. With the parts in the illustrated position, further movement of the piston rod to the left causes the pusher arm 232 to engage the end portion 228 of the rod 224, thus camming the carrier 208 to cause radially inward movement of the tube bending projection 218 and the tube scoring wheel 212. The amount of movement permitted is adjustable by means of the adjustable stop 234 which determines the depth to which the tube is scored and similarly the magnitude of the flexing of the end portion of the tube.

It will of course be apparent that as the carrier is shifted radially the tube beinding projection 218 first engages one side of the tube adjacent its free end. As the carrier continues to move radially during rotation, the tube engaging portion of the tube bending projection 218 is caused to move in a diminishing spiral toward, and in some cases across, the axis of the tube 150. At a predetermined point in the radial movement of the tube bending projection 218 the sharp edge 214 of the wheel 212 engages the outer surface of the tube. It will be observed that the portion of the tube engaged by the wheel is under tension as a result of the bending action of the projection 218. The tube bending force and the tube scoring action are repeatedly moved progressively aroud the tube. The adjustable abutment 234 limits inward movement of the wheel normally to a few one-thousandths of an inch, substantially less than the wall thickness of the tube. After the radially inward movement of the tube scoring wheel has been terminated, the tube bending operation is continued by gyrating the free end portion of the tube in a circular path until tube severance takes place.

The drawings and the foregoing specification constitute a description of the improved method and apparatus for cutting tubes in such full, clear, concise and exact terms as to enable any person skilled in the art to practice the invention, the scope of which is indicated by the appended claims.

What I claim as my invention is:

1. The method of severing tubing which comprises supporting the tubing at a support zone against lateral displacement and rotation, applying a cutting and bending action progressively around the tubing at a severing zone displaced axially of the tubing from the support zone, terminating the cutting action before the depth of cut approaches the wall thickness of the tubing and continuing the bending action progressively around the tubing until the tubing is severed.

2. The method of severing tubing which comprises supporting tubing at axially separated zones against lateral displacement, applying a cutting and bending action progressively around the tubing at a point substantially midway between the support zones, terminating the cutting action before the depth of cut approaches the wall thickness of the tubing and continuing the application of the bending action progressively around the tubing until it is severed.

3. The method of severing tubing which comprises supporting tubing at axially separated zones against lateral displacement, applying a cutting and bending action progressively around the tubing at a point substantially midway between the support zones, terminating the cutting action before the depth of cut approaches the wall thickness of the tubing, applying pressure progressively around the tubing directly adjacent the line of cut to press down the burrs formed by the cutting action, and continuing the application of the bending action progressively around the tubing until it is severed.

4. The method of severing an end from a tube which comprises supporting a portion of a tube adjacent its end against lateral displacement and rotation, scoring the tube progressively around the tube closely adjacent the supported portion, bending the end of the tube progressively around the tube to tension the portion of the tube being scored, terminating the scoring action and continuing the bending action until the tube end is severed at the score line.

5. The method of severing an end from a tube which comprises supporting a portion of a tube adjacent its end against lateral displacement and rotation, gyrating the end of the tube repeatedly in a spiral path of increasing radius, after predetermined gyration initiating a score action adjacent the supported portion of the tube at the side thereof under tension resulting from the gyration of the tube end, progressively moving the score action around the tube in timed relation to the gyration and increasing the depth of score, terminating the increase in depth of score and continuing the gyration until the tube end is severed.

6. Tube severing apparatus comprising a rotary device having a central opening for the reception of a tube to be severed, a cutter located adjacent one end of said opening, means for supporting a tube against lateral displacement at zones spaced axially of the tube from said cutter, and means for shifting said device to move said cutter radially of the tube during continuous rotation thereof.

7. Tube severing apparatus comprising a rotary device having a central opening for the reception of a tube to be severed, a cutter located adjacent one end of said opening, means for supporting a tube against lateral displacement at zones spaced axially of the tube from said cutter, means for shifting said device to move said cutter radially of the tube during continuous rotation thereof, and means to limit radial movement of said cutter.

8. Tube severing apparatus comprising a rotary device having a central opening for the reception of a tube to be severed, a cutter located adjacent one end of said opening, means for supporting a tube against lateral displacement at zones spaced axially of the tube from said cutter, means for shifting said device to move said cutter radially of the tube during continuous rotation thereof, and means to limit the depth of cut of said cutter to an amount substantially less than the wall thickness of the tube.

9. Tube severing apparatus comprising a rotary device having a central opening for the reception of a tube to be severed, a cutter located adjacent one end of said opening, means for supporting a tube against lateral displacement at zones spaced axially of the tube from said cutter, means for shifting said device to move said cutter radially of the tube during continuous rotation thereof, and abutment surfaces carried by said device engageable with a tube directly adjacent the line of cut produced by said cutter effective to limit the depth of cut and to provide for lateral displacement of the portion of the tube at said line of cut during continued rotation of said device.

10. Tube severing apparatus comprising a rotary housing having an axially extending opening therethrough, means for driving the housing in rotation, said housing having a diametrically located transverse opening intersecting the axial opening therethrough, a tube cutter movably received in said transverse opening and having members extending radially beyond the ends of said transverse opening, a cam sleeve movable longitudinally on said housing having inclined cam surfaces engaging said members, means for supporting a tube against transverse displacement at zones spaced axially of a tube in said axial opening from said cutter, and means for shifting said sleeve axially of said housing during rotation of said housing to move said cutter radially into engagement with the tube to score the tube and to flex it repeatedly at the score line to sever the tube.

11. Apparatus as defined in claim 10 in which said cutter comprises a cutting disc having a cutting edge at its outer periphery.

12. Apparatus as defined in claim 11 in which said cutter includes abutment surfaces at both sides of said disc effective to limit the depth of cut and to apply tube flexing pressure to the tube.

13. Apparatus as defined in claim 11 in which said cutter comprises a wheel having a shaft, a hub, a flange extending radially of said hub, an annular cutting disc on said hub engaging said flange adjacent the peripheral cutting edge of said disc, and a retainer secured to said wheel including a radial flange engageable with the disc adjacent its cutting edge thereof.

14. Apparatus as defined in claim 10 in which said cutter comprises an annulus having an inwardly directed cutting edge.

15. Apparatus as defined in claim 14 in which said annulus includes generally annular inclined rolling surfaces at either side of said cutting edge shaped to roll down burrs formed by the cutting edge and to apply tube flexing pressure progressively around the circumference of the tube as said housing is rotated.

16. A cutter assembly for use in severing tubing comprising a wheel having shaft means comprising oppositely extending shaft portions, a hub intermediate the ends of said shaft, and a radially outwardly extending flange terminating in a rolling surface of circular cross-section in planes perpendicular to the axis of said shaft means, a cutting disc on said hub having an acute included angle cutting edge, a plate secured to said wheel having a circular flange terminating in a rolling surface of circular cross-section in planes perpendicular to the axis of said shaft means, said rolling surfaces being located at either side of the cutting edge of said disc in position to limit the depth of cut of the disc around the tubing and to roll back burrs or protuberances formed at the sides of the cut.

17. An assembly as defined in claim 16 in which the flanges on said wheel and cover terminate in tapered peripheral portions inclined toward and engaging said disc.

18. An assembly as defined in claim 16 in which said rolling surfaces are conical surfaces having their larger diameter ends adjacent said disc and having included cone angles of less than 20 degrees.

19. An assembly as defined in claim 16 in which said rolling surfaces are conical surfaces having their larger diameter ends adjacent said disc and having included cone angles of about 10 degrees.

20. Tube cut-off apparatus comprising a clamp for gripping a tube to support the tube against lateral displacement, means to prevent rotation of said tube, a carrier rotatable about the axis of the tube, a cutter wheel on said carrier in position to engage the periphery of the tube directly adjacent said clamp, a tube bending projection on said carrier located closer to the axis of the tube than said wheel and spaced longitudinally of the tube from said clamp beyond said wheel, means for shifting said carrier during rotation thereof radially toward the axis of the tube to cause said projection to engage the tube and bend the tube progressively in a generally circular arc and thereafter to cause the wheel to score the tube progressively around the tube.

21. Apparatus as defined in claim 20 in which said clamp and carrier are mounted on a slide, means for advancing said slide, and cam means responsive to advance movement of said slide to sequentially actuate said clamp and shift said carrier radially of the tube during continued rotation of said carrier.

No references cited.

WILLIAM W. DYER, JR., *Primary Examiner.*

J. M. MEISTER, *Assistant Examiner.*